US011951795B2

United States Patent
Matsumoto et al.

(10) Patent No.: US 11,951,795 B2
(45) Date of Patent: Apr. 9, 2024

(54) SUSPENSION BUSH

(71) Applicants: Sumitomo Riko Company Limited, Aichi (JP); TOYOTA JIDOSHA KABUSHIKI KAISHA, Aichi (JP)

(72) Inventors: Yuki Matsumoto, Aichi (JP); Kyohei Yamashita, Toyota (JP); Shinya Iwahori, Toyota (JP)

(73) Assignees: Sumitomo Riko Company Limited, Aichi (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 408 days.

(21) Appl. No.: 17/344,909

(22) Filed: Jun. 10, 2021

(65) Prior Publication Data

US 2021/0402838 A1 Dec. 30, 2021

(30) Foreign Application Priority Data

Jun. 29, 2020 (JP) ................................ 2020-111251

(51) Int. Cl.
*F16F 1/38* (2006.01)
*B60G 7/02* (2006.01)

(52) U.S. Cl.
CPC .......... *B60G 7/02* (2013.01); *B60G 2204/143* (2013.01); *B60G 2204/4104* (2013.01);
(Continued)

(58) Field of Classification Search
CPC ............... B60G 7/02; B60G 2204/143; B60G 2204/4104; B60G 2204/4108;
(Continued)

(56) References Cited

U.S. PATENT DOCUMENTS

| 5,887,859 A | * | 3/1999 | Hadano | ................. F16F 1/3863 267/141.1 |
| 8,505,889 B2 | * | 8/2013 | Suzuki | ................. F16F 1/393 267/141.1 |

(Continued)

FOREIGN PATENT DOCUMENTS

| JP | H09100861 | 4/1997 |
| JP | 2008232195 | 10/2008 |
| JP | 2015010627 | 1/2015 |

OTHER PUBLICATIONS

"Office Action of Japan Counterpart Application", dated Oct. 23, 2023, with English translation thereof, pp. 1-7.

*Primary Examiner* — Thomas W Irvin
(74) *Attorney, Agent, or Firm* — JCIPRNET (57) ABSTRACT

In a suspension bush in which an intermediate member is arranged between an inner shaft member and an outer tube member that are connected by a main body rubber elastic body, a central portion in the axial direction of the inner shaft member includes an inner bulging portion projecting toward the outer periphery, the outer tube member includes an outer curved portion concave toward the inner periphery, and the intermediate member includes an intermediate curved portion concave toward the inner periphery. The main body rubber elastic body is pre-compressed by diameter reduction of the outer tube member, an inclination angle of both axial end parts of the outer curved portion with respect to the axial direction is increased by diameter reduction of the outer tube member 14, and both axial end parts of the outer curved portion are pressed against axial end portions of the main body rubber elastic body.

12 Claims, 6 Drawing Sheets

(52) U.S. Cl.
CPC .. *B60G 2204/4108* (2013.01); *B60G 2206/42* (2013.01); *B60G 2206/73* (2013.01); *B60G 2206/82092* (2013.01); *B60G 2800/162* (2013.01)

(58) Field of Classification Search
CPC ............ B60G 2206/42; B60G 2206/73; B60G 2206/82092; B60G 2800/162; F16F 1/38; F16F 1/393
See application file for complete search history.

(56) References Cited

U.S. PATENT DOCUMENTS

| | | | | |
|---|---|---|---|---|
| 9,475,358 | B2* | 10/2016 | Grim | B60G 7/02 |
| 9,752,637 | B2* | 9/2017 | Kuki | F16F 1/393 |
| 10,865,845 | B2* | 12/2020 | Niwa | F16F 1/38 |
| 10,994,583 | B2* | 5/2021 | Matsumura | B60G 21/0551 |
| 11,299,003 | B2* | 4/2022 | Kim | B60G 7/001 |
| 11,433,725 | B2* | 9/2022 | Sano | F16F 1/3863 |
| 2002/0060385 | A1* | 5/2002 | Mayerbock | F16F 13/14 |
| | | | | 267/293 |
| 2009/0289399 | A1* | 11/2009 | Suzuki | F16F 1/393 |
| | | | | 267/140.12 |
| 2015/0247543 | A1* | 9/2015 | Kuki | F16F 1/393 |
| | | | | 156/92 |
| 2015/0273967 | A1* | 10/2015 | Grim | F16F 1/393 |
| | | | | 267/292 |
| 2019/0226543 | A1* | 7/2019 | Niwa | F16F 1/387 |
| 2019/0263214 | A1* | 8/2019 | Matsumura | B60G 21/0551 |
| 2023/0029849 | A1* | 2/2023 | Kume | F16C 27/02 |
| 2023/0067436 | A1* | 3/2023 | Kume | F16F 1/387 |

* cited by examiner

SUSPENSION BUSH

CROSS-REFERENCE TO RELATED APPLICATION

This application claims the priority of Japan patent application serial no. 2020-111251, filed on Jun. 29, 2020. The entirety of the above-mentioned patent application is hereby incorporated by reference herein and made a part of this specification.

BACKGROUND

Technical Field

The disclosure relates to a suspension bush that connects a suspension arm of a vehicle to a vehicle body side in a vibration-proof manner.

Related Art

Conventionally, in a suspension mechanism for an automobile, a suspension arm that connects a carrier for supporting wheels and a vehicle body side is mounted on the vehicle body side by a suspension bush. As disclosed in Japanese Patent Laid-Open No. 9-100861 (Patent literature 1), the suspension bush has a structure in which an inner shaft member and an outer tube member are connected in the radial direction by a main body rubber elastic body. Besides, the suspension bush is mounted on the vehicle in a direction in which a central axis of the inner shaft member and the outer tube member is orthogonal to a central axis of the suspension arm.

LITERATURE OF RELATED ART

Patent Literature

[Patent literature 1] Japanese Patent Laid-Open No. 9-100861

Incidentally, the suspension bush is required to have a stiff spring property for an input in a direction perpendicular to an axis (radial direction) for a purpose of improving travel stability of the vehicle and the like. Thus, a suspension bush is also proposed in which the main body rubber elastic body is thin-walled in the radial direction and a spring of the main body rubber elastic body in the direction perpendicular to an axis is made stiff by arranging an intermediate member between the inner shaft member and the outer tube member in the radial direction.

In addition, the suspension bush is required to have a soft spring property for an input in a prying direction in which the inner shaft member and the outer tube member are relatively tilted for a purpose of improving riding comfort of the vehicle. Thus, a suspension bush is also proposed which has a structure in which an inner bulging portion that projects toward the outer periphery is arranged in a central portion in the axial direction of the inner shaft member, and a central portion in the axial direction of the intermediate member is set as an intermediate curved portion having a curved vertical cross-sectional shape that is concave toward the inner periphery. Thereby, during the input in the prying direction, a compression spring component of the main body rubber elastic body is suppressed and a shear spring component is dominant between the inner bulging portion and the intermediate curved portion, and therefore the soft spring property is realized.

However, as for the conventional suspension bush, there is also a case where if the soft spring property is to be sufficiently realized in the prying direction, the stiff spring property in the direction perpendicular to an axis is difficult to realize simultaneously. A suspension bush capable of realizing required spring property more highly in each direction is required.

The disclosure provides a suspension bush having a novel structure and capable of realizing the required spring property more highly.

Hereinafter, preferred aspects for grasping the disclosure are described, but each aspect described below is described as an example. Not only can each aspect described below be appropriately combined with each other and adopted, but also a plurality of constituent elements described in each aspect can be recognized and adopted independently as much as possible, and can also be appropriately combined with any of constituent elements described in another aspect and adopted. Thereby, in the disclosure, various other aspects can be realized without being limited to the aspects described below.

SUMMARY

A first aspect is a suspension bush in which an inner shaft member and an outer tube member are connected in a radial direction by a main body rubber elastic body, and an intermediate member is arranged between the inner shaft member and the outer tube member in the radial direction and fixed to the main body rubber elastic body, wherein the inner shaft member includes an inner bulging portion located at a central portion in an axial direction and having an outer surface shape that is convex toward an outer periphery of the inner shaft member, the outer tube member includes an outer curved portion located at the central portion in the axial direction and having a curved cross-sectional shape that is concave toward an inner periphery of the outer tube member, the intermediate member includes an intermediate curved portion located at the central portion in the axial direction and having a curved cross-sectional shape that is concave toward an inner periphery of the intermediate member, the main body rubber elastic body is pre-compressed by diameter reduction of the outer tube member, an inclination angle of both axial end parts of the outer curved portion with respect to the axial direction is increased by diameter reduction of the outer tube member, and both axial end parts of the outer curved portion are pressed against axial end portions of the main body rubber elastic body.

Another aspect is a suspension bush in which an inner shaft member and an outer tube member are connected in a radial direction by a main body rubber elastic body, and an intermediate member is arranged between the inner shaft member and the outer tube member in the radial direction and fixed to the main body rubber elastic body, wherein the inner shaft member includes an inner bulging portion located at a central portion in an axial direction and having an outer surface shape that is convex toward an outer periphery of the inner shaft member, the outer tube member includes an outer curved portion located at the central portion in the axial direction and having an inner surface shape that is concave toward an inner periphery of the outer tube member, and the intermediate member includes an intermediate curved portion located at the central portion in the axial direction and having a curved cross-sectional shape that is concave toward an inner periphery of the intermediate member; and a radial thickness dimension of the intermediate member is larger than a part of the intermediate curved portion that is deviated outward in the axial direction, and a radial thickness dimension of an inner layer rubber in the main body rubber elastic body that is arranged closer to an inner peripheral side than the intermediate member is larger than a radial thickness dimension of an outer layer rubber in the main body rubber elastic body that is arranged closer to an outer peripheral side than the intermediate member at the central portion in the axial direction.

DESCRIPTION OF THE EMBODIMENTS

Hereinafter, embodiments of the disclosure are described with reference to the drawings.

In FIG. 1 to FIG. 4, a suspension bush 10 serving as an embodiment of the disclosure is shown. The suspension bush 10 has a structure in which an inner shaft member 12 and an outer tube member 14 are connected to each other by a main body rubber elastic body 16. In the following description, as a general rule, an up-down direction refers to an up-down direction in FIG. 4, and a front-rear direction refers to a left-right direction in FIG. 1 which is a central axis direction of the bush, respectively.

Figure 1:
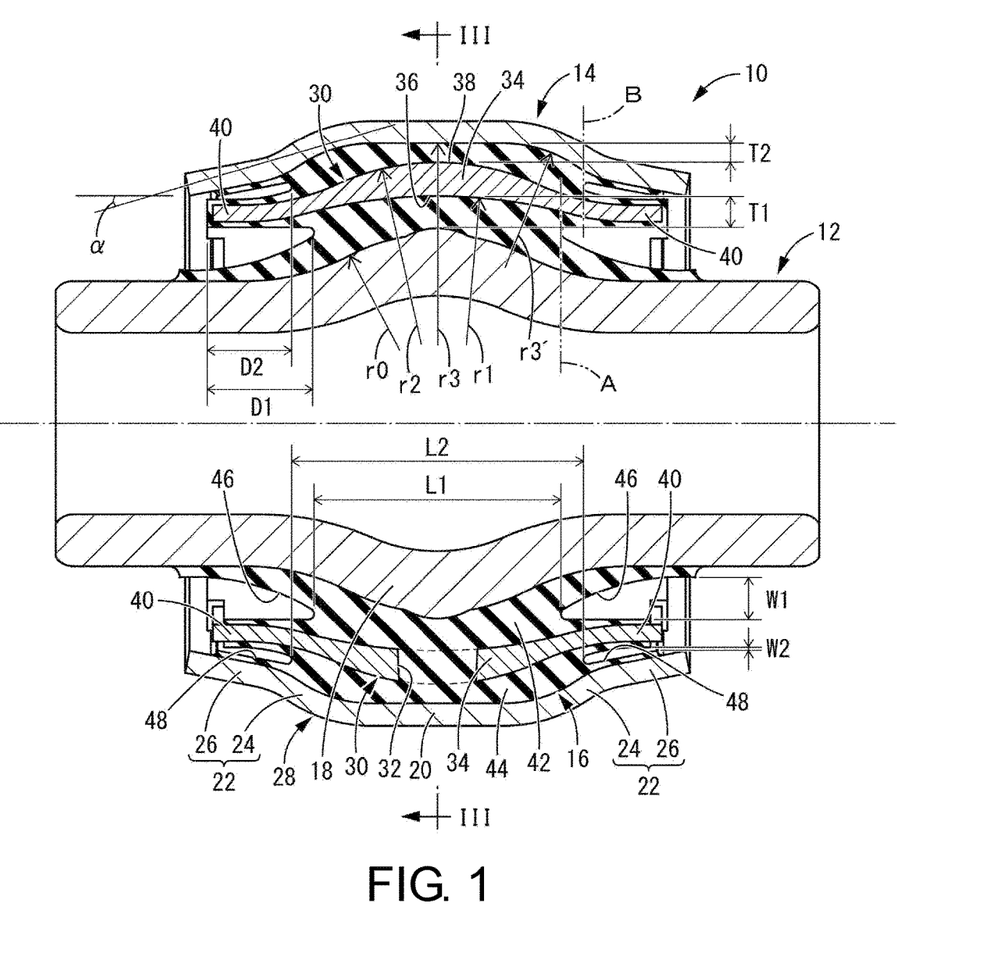
FIG. 1 is a vertical cross-sectional view showing a suspension bush serving as an embodiment of the disclosure, and is a diagram corresponding to a I-I cross section in FIG. 4.
Figure 2:
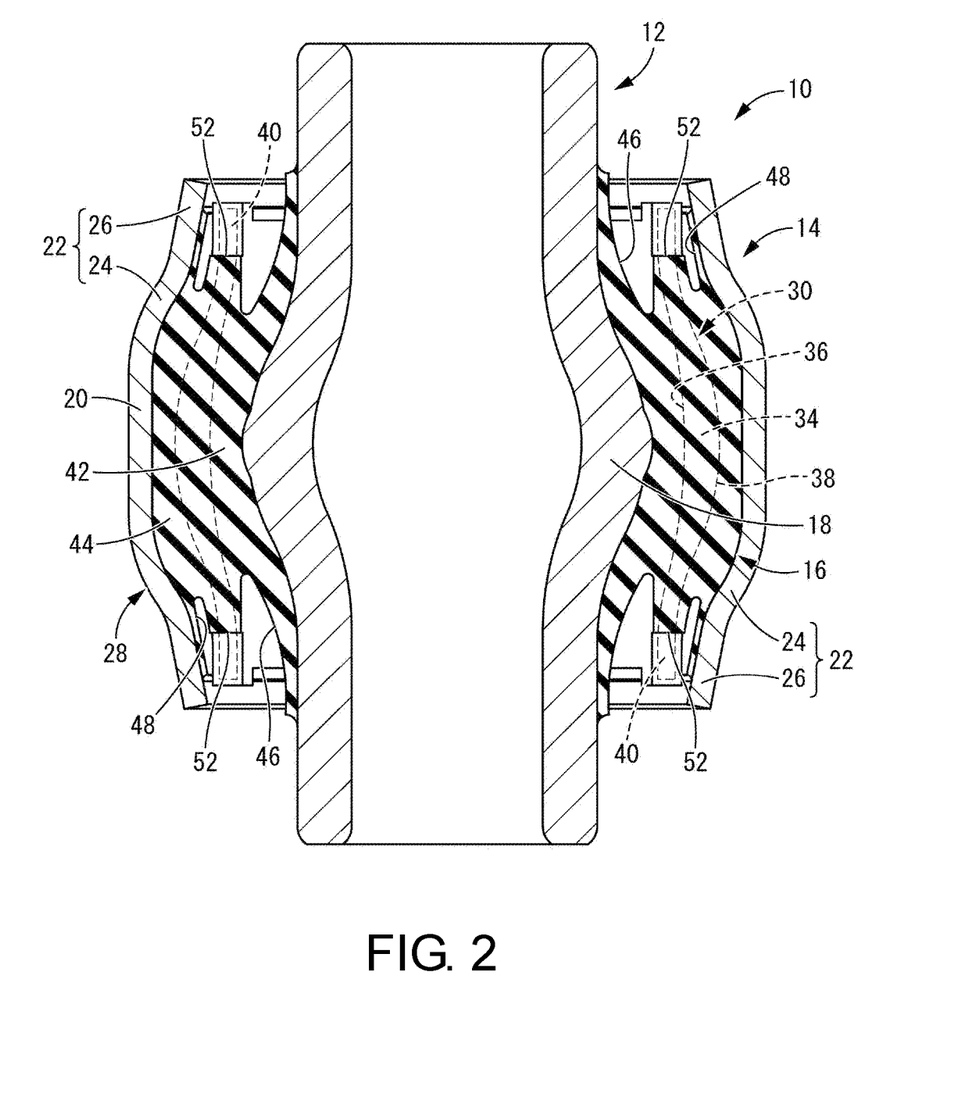
FIG. 2 is a vertical cross-sectional view of the suspension bush shown in FIG. 1, and is a diagram corresponding to a II-II cross section in FIG. 4.

The inner shaft member 12 is, for example, a hard member formed by a metal such as iron, an aluminum alloy, or the like. The inner shaft member 12 has a substantially cylindrical shape with a thick wall and a small diameter as a whole. Both axial end parts of the inner shaft member 12 extend linearly, and a central portion in the axial direction of the inner shaft member 12 is an inner bulging portion 18 having a curved shape that is convex toward the outer periphery in a vertical cross section shown in FIG. 1 and FIG. 2. As shown in FIG. 1 and FIG. 2, the inner bulging portion 18 has a substantially constant arcuate cross section over the entire periphery, and projects toward the outer periphery with the diameter at the axial center larger than the diameters at both axial ends. The inner shaft member 12 of the embodiment is manufactured by casting, and an outer peripheral surface of the central portion in the axial direction of the inner bulging portion 18 projects toward the outer periphery with a larger curvature.

The outer tube member 14 is, for example, a hard member formed by a metal such as iron, an aluminum alloy, or the like. The outer tube member 14 has a substantially cylindrical shape with a thin wall and a large diameter as a whole. A central portion in the axial direction of the outer tube member 14 is a straight portion 20 that extends linearly with a substantially constant diameter, and both axial end parts of the outer tube member 14 are tapered portions 22 that have a diameter gradually decreasing toward the axial outer side. The tapered portion 22 of the embodiment includes a first tapered portion 24 connected to the straight portion 20, and a second tapered portion 26 extending axially outward from the first tapered portion 24. The first tapered portion 24 has a larger inclination angle with respect to the axial direction as compared with the second tapered portion 26. In addition, a central portion in the axial direction of the outer tube member 14 including the straight portion 20 and the first tapered portion 24 is an outer curved portion 28 having a curved shape that is convex toward the outer periphery in the vertical cross section shown in FIG. 1 and FIG. 2. Moreover, in the outer tube member 14, both a connection part between the straight portion 20 and the first tapered portion 24 and a connection part between the first tapered portion 24 and the second tapered portion 26 desirably have a smooth curved cross-sectional shape, and have no broken points or broken lines on the surface.

The inner shaft member 12 and the outer tube member 14 are coaxially arranged and elastically connected by the main body rubber elastic body 16. The main body rubber elastic body 16 has a substantially cylindrical shape as a whole, an inner peripheral surface of the main body rubber elastic body 16 is fixed to an outer peripheral surface of the inner shaft member 12, and an outer peripheral surface of the main body rubber elastic body 16 is fixed to an inner peripheral surface of the outer tube member 14. A pair of intermediate members 30, 30 is arranged between the inner shaft member 12 and the outer tube member 14 in the radial direction, and the intermediate members 30, 30 are fixed to a radial intermediate part of the main body rubber elastic body 16.

Figure 3:
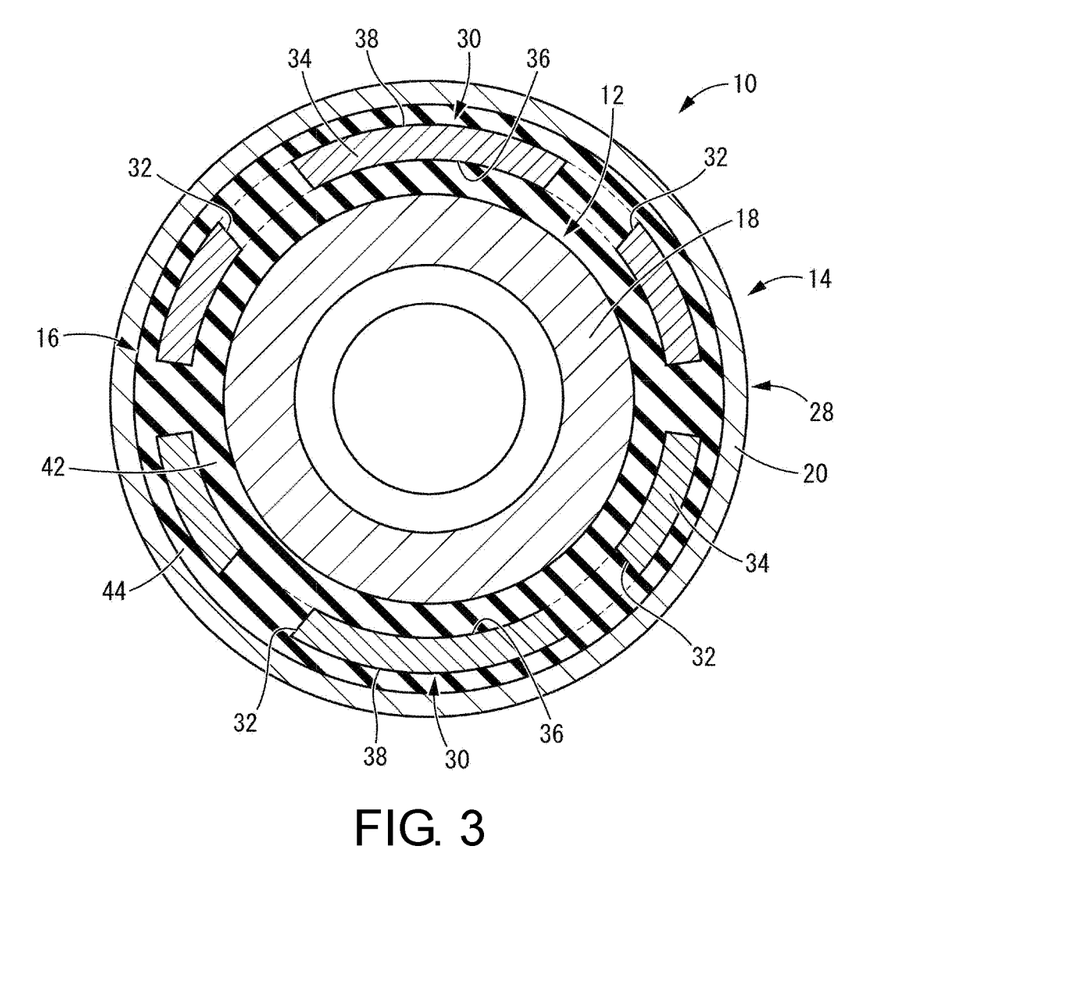
FIG. 3 is a sectional view taken along a III-III line in FIG. 1.

The intermediate member 30 is a hard member formed by a metal, synthetic resin, or the like. The intermediate member 30 has a curved plate shape, and extends in a circumferential direction with a length of less than half a circumference. As shown in FIG. 1 and FIG. 3, the intermediate member 30 has a through hole 32 that radially penetrates a central portion in the axial direction at two circumferential locations. The pair of intermediate members 30, 30 is arranged in a manner of facing each other in the up-down direction, and circumferential end portions of the pair of intermediate members 30, 30 are separated from each other in an opposite direction of the pair of intermediate members 30, 30.

The central portion in the axial direction of the intermediate member 30 is an intermediate curved portion 34 having a curved shape that is convex toward the outer periphery in the vertical cross section shown in FIG. 1. An inner peripheral surface 36 of the intermediate curved portion 34 has an arcuate curved cross-sectional shape that is concave toward the inner periphery, and an outer peripheral surface 38 of the intermediate curved portion 34 has an arcuate curved cross-sectional shape that is convex toward the outer periphery. In addition, in the intermediate curved portion 34, a curvature radius r1 of the inner peripheral surface 36 is larger than a curvature radius r2 of the outer peripheral surface 38, and a curvature of the inner peripheral surface 36 is smaller than a curvature of the outer peripheral surface 38. Thereby, the intermediate curved portion 34 is gradually thick-walled from both axial ends toward an axial center.

The curvature radius r2 of the outer peripheral surface 38 at the axial center of the intermediate curved portion 34 is larger than a curvature radius r0 of the outer peripheral surface at the axial center of the inner bulging portion 18. In the embodiment, a curvature radius r3 at an axial center of the outer curved portion 28 is larger than the curvature radius r1 of the inner peripheral surface 36 at the axial center of the intermediate curved portion 34 because the curvature radius r3 has a linear shape. The first tapered portion 24 of the outer curved portion 28 is radially close to the intermediate member 30 toward the axial outer side. Moreover, in the embodiment, because the inner peripheral surface 36 and the outer peripheral surface 38 of the intermediate curved portion 34 and the outer peripheral surface of the inner bulging portion 18 have an arcuate cross section having a substantially constant curvature radius as a whole in the axial direction, the curvature radii r0, r1 and r2 are shown at positions deviated from an axial center in FIG. 1 for ease of visibility.

End portions 40 closer to the axial outer side than the intermediate curved portion 34 in the intermediate member 30 are smoothly continuous with respect to both axial ends of the intermediate curved portion 34, and have a substantially constant thickness dimension. In the intermediate member 30, a thickness dimension of the intermediate curved portion 34 is larger than a thickness dimension of the end portion 40. Moreover, in the embodiment, a maximum thickness dimension of the intermediate curved portion 34 is substantially twice the thickness dimension of the end portion 40.

The intermediate members 30, 30 are arranged on both upper and lower sides of the inner shaft member 12 in a manner of extending circumferentially between the inner shaft member 12 and the outer tube member 14 in the radial direction, and are fixed to the radial intermediate part of the main body rubber elastic body 16. Besides, the main body rubber elastic body 16 is configured by an inner layer rubber 42 arranged on the inner peripheral side of the intermediate members 30, 30, and an outer layer rubber 44 arranged on the outer peripheral side of the intermediate members 30, 30. Moreover, the inner layer rubber 42 and the outer layer rubber 44 are integrated through a circumferential space between the pair of intermediate members 30, 30 and a plurality of through holes 32. In addition, the inner layer rubber 42 and the outer layer rubber 44 are also connected to each other on the axial outer side of the intermediate members 30, 30.

The inner layer rubber 42 is arranged between the inner shaft member 12 and the intermediate members 30, 30. The inner layer rubber 42 includes concave inner scooped portions 46 that open to axial end surfaces on both axial sides. The inner scooped portion 46 has a groove shape extending continuously over the entire periphery in the circumferential direction. The inner scooped portion 46 is configured by a curved surface of which the inner surface is smoothly continuous. A radial width dimension W1 at an opening end of the inner scooped portion 46 is a maximum radial width dimension, and the radial width dimension of the inner scooped portion 46 gradually decreases from the opening end to a bottom end (an axial inner end). The inner scooped portion 46 is arranged so that the axial end surface of the inner layer rubber 42 is a concave surface, and thereby a wide free surface at an axial end of the inner layer rubber 42 is secured, and the durability of the inner layer rubber 42 is improved. A radial thickness dimension of the inner layer rubber 42 is maximum near the axial inner end of the inner scooped portion 46, and the radial thickness dimension of the inner layer rubber 42 at an axial center is smaller than the radial thickness dimension at the axial inner end of the inner scooped portion 46.

The outer layer rubber 44 is arranged between the outer tube member 14 and the intermediate members 30, 30. The outer layer rubber 44 includes concave outer scooped portions 48 that open to axial end surfaces on both axial sides. The outer scooped portion 48 has a groove shape extending continuously over the entire periphery in the circumferential direction. The outer scooped portion 48 is configured by a curved surface of which the inner surface is smoothly continuous. A radial width dimension of the outer scooped portion 48 on a bottom side is larger than a radial width dimension of the outer scooped portion 48 at an opening end. In the embodiment, the radial width dimension of the outer scooped portion 48 is maximum at an axial intermediate part which is the part between the opening end and a bottom end (an axial inner end) of the outer scooped portion 48, and a radial width dimension in at least the axial intermediate part is larger than a radial width dimension W2 at the opening end. The outer scooped portion 48 is arranged so that the axial end surface of the outer layer rubber 44 is a concave surface, and thereby a wide free surface at an axial end of the outer layer rubber 44 is secured, and the durability of the outer layer rubber 44 is improved. A radial thickness dimension of the outer layer rubber 44 is maximum near the axial inner end of the outer scooped portion 48, and the radial thickness dimension of the outer layer rubber 44 at an axial center is smaller than the radial thickness dimension at the axial inner end of the outer scooped portion 48.

The radial thickness dimension of the inner layer rubber 42 is larger than the radial thickness dimension of the outer layer rubber 44. In particular, at an axial center, a radial thickness dimension T1 of the inner layer rubber 42 is larger than a radial thickness dimension T2 of the outer layer rubber 44. It is desirably that the radial thickness dimension of the inner layer rubber 42 is always larger than the radial thickness dimension of the outer layer rubber 44 at same positions in the axial direction closer to the axial inner side than the scooped portions 46 and 48.

An axial depth dimension D1 of the inner scooped portion 46 is larger than an axial depth dimension D2 of the outer scooped portion 48, and the axial inner end of the inner scooped portion 46 is located closer to the axial inner side than the axial inner end of the outer scooped portion 48. Thereby, an axial length L1 of the inner layer rubber 42, which is a distance between the axial inner ends of the inner scooped portions 46, 46 on both axial sides, is smaller than an axial length L2 of the outer layer rubber 44, which is a distance between the axial inner ends of the outer scooped portions 48, 48 on both axial sides.

A virtual line A extending radially through the axial inner end of the inner scooped portion 46 intersects with the inner bulging portion 18 on the inner peripheral side, and intersects with the intermediate curved portion 34 on the outer peripheral side. In short, the axial inner end of the inner scooped portion 46 is located between the inner bulging portion 18 and the intermediate curved portion 34 in the radial direction. In addition, a virtual line B extending radially through the axial inner end of the outer scooped portion 48 intersects with the intermediate curved portion 34 of the intermediate member 30 on the inner peripheral side, and intersects with the first tapered portion 24 in the outer curved portion 28 of the outer tube member 14 on the outer peripheral side. In short, the axial inner end of the outer scooped portion 48 is located between the intermediate curved portion 34 and the first tapered portion 24 in the radial direction.

In addition, the radial thickness dimension of the inner layer rubber 42 changes in a manner of gradually increasing from the axial center toward the virtual line A. Within a range from the axial center to the virtual line A, the curvature radius r0 of the outer peripheral surface of the inner bulging portion 18 is smaller than the curvature radius r1 of the inner peripheral surface 36 of the intermediate curved portion 34 (r0<r1). On the other hand, the radial thickness dimension of the outer layer rubber 44 is larger at a position of the virtual line B than at the axial center, but a point of maximum thickness is located closer to the axial inner side than this virtual line B. That is, the radial thickness dimension of the outer layer rubber 44 gradually increases from the axial center toward the virtual line B, and decreases after passing the maximum thickness part. At the central portion in the axial direction, the curvature radius r3 ($\approx \infty$) of the inner peripheral surface of the outer curved portion 28 is larger than the curvature radius r2 of the outer peripheral surface 38 of the intermediate curved portion 34 (r3>r2), but at parts near the virtual line B on both sides, a curvature radius r3' of the inner peripheral surface of the outer curved portion 28 is smaller than the curvature radius r2 of the outer peripheral surface 38 of the intermediate curved portion 34 (r3'<r2).

Figure 4:
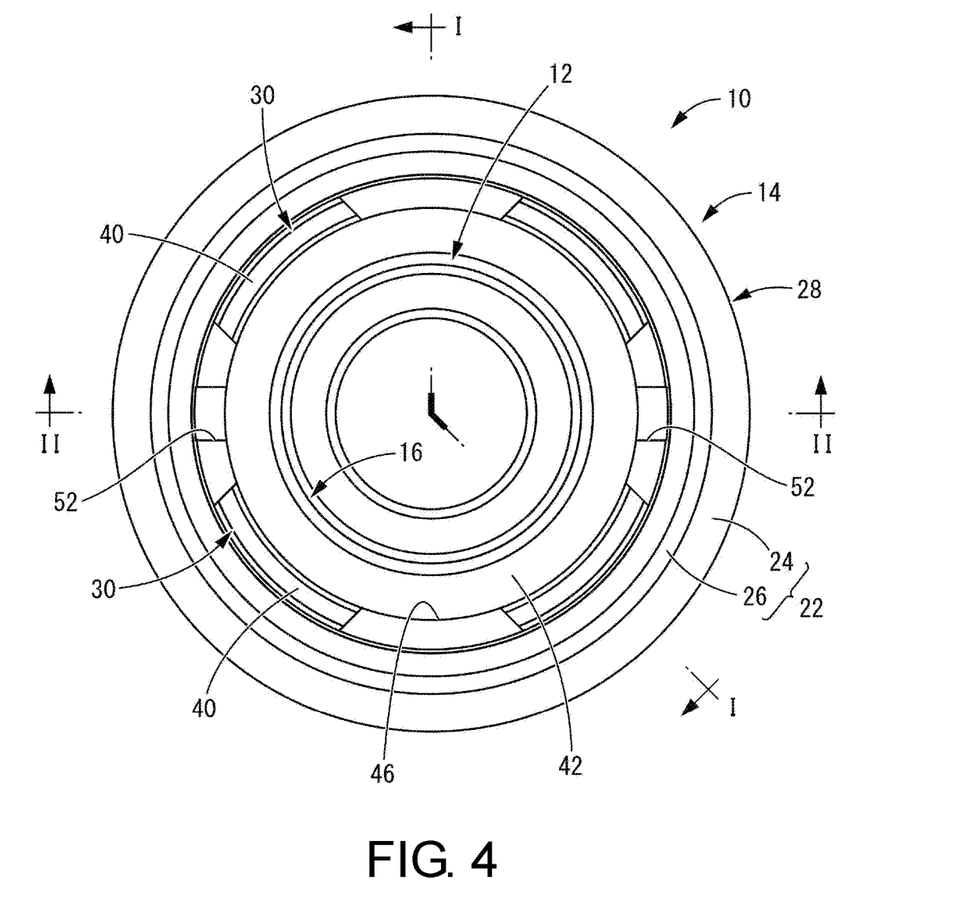
FIG. 4 is a front view of the suspension bush shown in FIG. 1.
Figure 5:
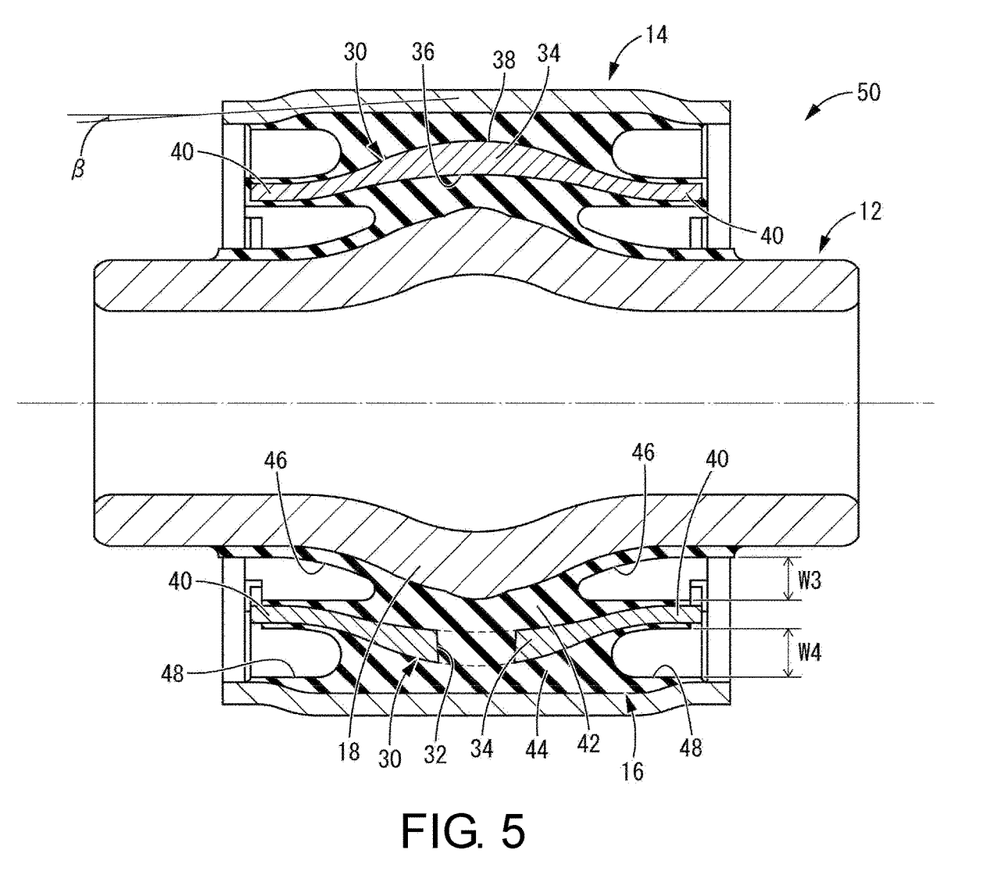
FIG. 5 is a vertical cross-sectional view corresponding to FIG. 1 and showing the suspension bush shown in FIG. 1 as an integrally vulcanized molded product before diameter reduction processing of an outer tube member.
Figure 6:
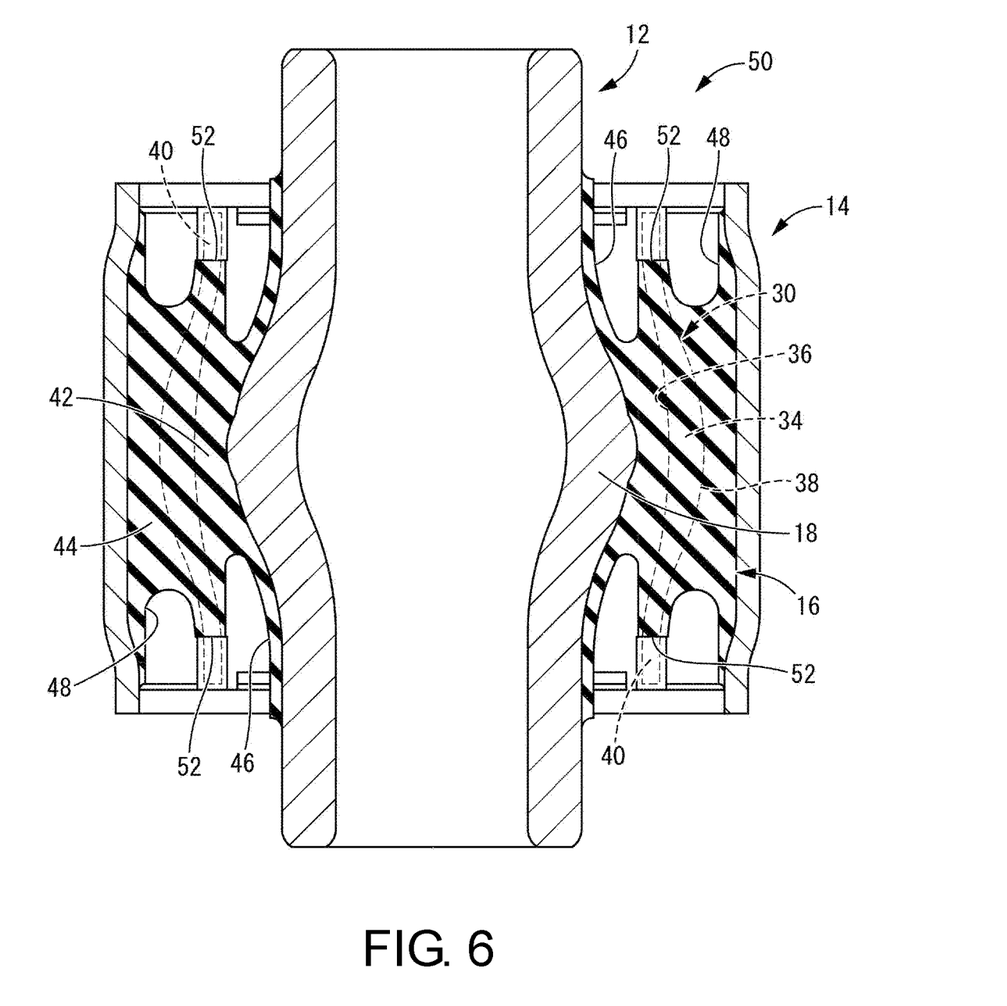
FIG. 6 is a vertical cross-sectional view corresponding to FIG. 2 and showing the suspension bush shown in FIG. 1 as an integrally vulcanized molded product before the diameter reduction processing of the outer tube member.

The main body rubber elastic body 16 is formed as an integrally vulcanized molded product 50 including the inner shaft member 12, the outer tube member 14, and the intermediate members 30, 30 as shown in FIG. 5 and FIG. 6. A concave portion 52 that opens to an axial end surface is arranged between circumferential end portions of the intermediate members 30, 30 in the main body rubber elastic body 16. As shown in FIG. 2, FIG. 4 and FIG. 6, the concave portion 52 has a groove shape that radially penetrates between the intermediate members 30, 30 in the circumferential direction in the main body rubber elastic body 16, and two concave portions 52, 52 respectively open to end surfaces on both axial sides. The concave portion 52 opens to the axial end surface of the main body rubber elastic body 16 closer to the axial outer side than the intermediate members 30, 30, and a bottom surface (a surface on the axial inner side) of the concave portion 52 is located closer to the axial inner side than the axial end surfaces of the intermediate members 30, 30. During vulcanization molding of the main body rubber elastic body 16, an injection port for injecting a rubber material into a cavity of a mold is arranged at a location corresponding to the bottom surface of the concave portion 52.

The integrally vulcanized molded product 50 of the main body rubber elastic body 16 is made into the suspension bush 10 in a manner that a diameter of the outer tube member 14 is reduced by diameter reduction processing such as an eight-way drawing and the like. In the outer tube member 14 before the diameter reduction processing, a central portion in the axial direction has a cylindrical shape extending linearly in the axial direction with a substantially constant diameter, and both axial end portions have a cylindrical shape extending linearly in the axial direction with a substantially constant diameter smaller than that of the central portion in the axial direction. The outer tube member 14 before the diameter reduction processing has a structure in which the central portion in the axial direction and both axial end portions are integrally and continuously arranged via a tapered tubular intermediate part that becomes smaller in diameter toward the axial outer side.

Before the diameter reduction processing of the outer tube member 14, a radial width dimension W4 at the opening end of the outer scooped portion 48 is larger than a radial width dimension W3 at the opening end of the inner scooped portion 46. In particular, before the diameter reduction processing of the outer tube member 14, the radial width dimension of the outer scooped portion 48 gradually increases from the axial inner end which is the bottom end toward the opening end, and a maximum radial width dimension of the outer scooped portion 48 is larger than a maximum radial width dimension of the inner scooped portion 46.

By the diameter reduction processing of the outer tube member 14, the main body rubber elastic body 16 arranged between the inner shaft member 12 and the outer tube member 14 in the radial direction is pre-compressed in the radial direction, and a tensile stress caused by cooling shrinkage after molding is reduced. Because the pair of intermediate members 30, 30 independent of each other is arranged separately from each other in the radial direction, by the diameter reduction processing of the outer tube member 14, the pair of intermediate members 30, 30 approaches each other in the opposite radial direction. Thereby, both the inner layer rubber 42 and the outer layer rubber 44 of the main body rubber elastic body 16 are pre-compressed in the radial direction by the diameter reduction processing of the outer tube member 14.

During the diameter reduction processing of the outer tube member 14, the outer tube member 14 is reduced in diameter more at both end parts than at the central portion in the axial direction. Thereby, after the diameter reduction, the outer tube member 14 is processed into a shape in which both axial end parts of the outer tube member 14 are inclined more toward the inner peripheral side than a shape before the diameter reduction, and the tapered portions 22 are formed at both axial end parts of the outer tube member 14. Besides, the tapered portions 22 including the first tapered portions 24 which are both axial end parts of the outer curved portion 28 are pressed against outer peripheral surfaces of axial end portions of the main body rubber elastic body 16. The main body rubber elastic body 16 is pre-compressed at a larger compression rate in parts where the first tapered portions 24 located closer to the axial inner side than the scooped portions 46 and 48 are pressed. Moreover, the pressing of the outer curved portion 28 against the main body rubber elastic body 16 may be set by a diameter reduction rate of the outer curved portion 28 in a manufacturing process, and may also be objectively grasped in the suspension bush 10 after the diameter reduction processing from, for example, measurement of a stress of the main body rubber elastic body 16, or an elastic restoration shape of the main body rubber elastic body 16 after the outer tube member 14 is removed.

In the outer tube member 14, an average inclination angle α of the tapered portion 22 with respect to the axial direction after the diameter reduction processing is larger than an average inclination angle β of both end parts corresponding to the tapered portion 22 with respect to the axial direction before the diameter reduction processing. In particular, the first tapered portion 24 and the second tapered portion 26 in the outer tube member 14 after the diameter reduction processing respectively have a larger inclination angle with respect to parts corresponding to the first tapered portion 24 and the second tapered portion 26 in the outer tube member 14 before the diameter reduction processing. Moreover, the central portion in the axial direction of the outer tube member 14 is reduced in diameter in the radial direction without any change in an inclination angle with respect to the axial direction.

In addition, the inner scooped portion 46 and the outer scooped portion 48 are respectively deformed by the pre-compression of the main body rubber elastic body 16. That is, the inner scooped portion 46 and the outer scooped portion 48 become smaller in radial width dimension and smaller in depth dimension by the pre-compression of the main body rubber elastic body 16 due to the diameter reduction processing of the outer tube member 14. In particular, by largely reducing the diameters of both axial end parts of the outer tube member 14, the radial width dimension W2 of the outer scooped portion 48 is significantly reduced, and the radial width dimension W2 of the opening end of the outer scooped portion 48 is smaller than the radial width dimension W1 of the opening end of the inner scooped portion 46.

In this way, the outer tube member 14 is subjected to the diameter reduction processing in order that a diameter reduction rate is increased at both axial end parts, and thereby the outer layer rubber 44 is pre-compressed with a larger compression rate at both axial end portions (near the axial inner ends of the outer scooped portion 48) than at the axial center. Thereby, the outer layer rubber 44 is less likely to be elastically deformed axially outward, and a spring property in a direction perpendicular to an axis is made stiff.

This suspension bush 10 according to the embodiment is attached to a vehicle, for example, by attaching the inner shaft member 12 to a suspension arm (not shown) and attaching the outer tube member 14 to a subframe (not shown). Besides, a vibration-proof effect obtained by a vibration damping action and a vibration insulating action of the main body rubber elastic body 16 is exerted on a vibration input from wheels due to unevenness of the ground and the like.

A spring property of the suspension bush 10 for an input in the radial direction (the direction perpendicular to an axis) is made stiff, and travel stability of the vehicle can be improved by the suspension bush 10. That is, in the suspension bush 10, the intermediate members 30, 30 are arranged between the inner shaft member 12 and the outer tube member 14, and a radial thickness dimension of the main body rubber elastic body 16 is reduced by the intermediate members 30, 30. Thereby, the spring property in the radial direction of the suspension bush 10 is made stiff, and the improvement of the travel stability of the vehicle and the like are achieved.

In particular, a distance between facing surfaces of the inner shaft member 12 and the outer tube member 14 in the radial direction is shortened at the central portion in the axial direction, and the main body rubber elastic body 16 is thin-walled at the central portion in the axial direction. Furthermore, because the intermediate curved portion 34 of each intermediate member 30 is gradually thick-walled toward the axial center, the radial thickness dimension of the main body rubber elastic body 16 is made smaller at the axial center. Thereby, the spring property in the direction perpendicular to an axis is made stiffer, and the travel stability of the vehicle is improved.

Moreover, because both axial end parts of the outer tube member 14 are subjected to the diameter reduction processing in order that the inclination angle is increased, the main body rubber elastic body 16 is pre-compressed particularly significantly at both axial end parts. Thereby, the main body rubber elastic body 16 is suppressed from bulging and deforming axially outward with respect to the input in the direction perpendicular to an axis, and a stiff spring property may be set in the main body rubber elastic body 16.

In particular, the radial width dimension of the outer scooped portion 48 before the diameter reduction processing of the outer tube member 14 is larger than that of the inner scooped portion 46, but the radial width dimension of the outer scooped portion 48 after the diameter reduction processing of the outer tube member 14 is smaller than that of the inner scooped portion 46, and both axial end parts of the outer layer rubber 44 are significantly pre-compressed in the radial direction. Therefore, the outer layer rubber 44 is more effectively suppressed from bulging and deforming axially outward, and the stiff spring property in the direction perpendicular to an axis is advantageously realized by the outer layer rubber 44 without stiffening a spring of the inner layer rubber 42 which significantly affects a spring property for an input in a prying direction.

In addition, a soft spring property is exerted on the input in the prying direction between the inner shaft member 12 and the outer tube member 14. That is, the inner bulging portion 18 is arranged at a center portion in the axial direction of the inner shaft member 12, the outer curved portion 28 is arranged at a center portion in the axial direction of the outer tube member 14, and the intermediate curved portions 34 are respectively arranged at the center portions in the axial direction of the intermediate members 30, 30. Thereby, because a compression spring component of the main body rubber elastic body 16 is reduced and a shear spring component of the main body rubber elastic body 16 is increased for the input in the prying direction, the soft spring property is exerted.

Furthermore, the inner layer rubber 42 of the main body rubber elastic body 16 is more thick-walled in the radial direction than the outer layer rubber 44, the inner scooped portion 46 reaches axially further inward than the outer scooped portion 48, and the axial length L1 of the inner layer rubber 42 is shorter than the axial length L2 of the outer layer rubber 44. Thereby, in the inner layer rubber 42, a relatively soft compression spring property is realized, and a compression spring component for a prying input is reduced so that the soft spring property for the input in the prying direction is realized. Because the inner layer rubber 42 has a shorter circumferential length than the outer layer rubber 44 and mainly deforms with respect to the input in the prying direction, by realizing a soft prying spring property in the inner layer rubber 42, the spring property in the prying direction of the suspension bush 10 can be softened.

In addition, because the intermediate curved portion 34 of each intermediate member 30 is gradually thick-walled toward the axial center, the radial thickness of the main body rubber elastic body 16 is thin-walled at the axial center. Thereby, when the inner shaft member 12 and the outer tube member 14 are pried and displaced to be relatively tilted, a relatively soft spring property is realized by ensuring the radial thickness of the main body rubber elastic body 16 on both axial sides where the compression spring component is dominant. Furthermore, at the axial center of the main body rubber elastic body 16 which is thin-walled, the inner shaft member 12 and the outer tube member 14 are close to a center of the prying displacement, and a contribution to the prying spring is small, thus suppressing an adverse effect on the soft prying spring property.

In addition, the inner layer rubber 42 is more thick-walled in the radial direction than the outer layer rubber 44, and the axial length L1 of the inner layer rubber 42 is shorter than the axial length L2 of the outer layer rubber 44, and thereby the soft spring property for an input in a twisting direction is also realized in the inner layer rubber 42. In the inner layer rubber 42 which has a shorter circumferential length and a smaller rubber volume than the outer layer rubber 44, by reducing the spring for the input in the twisting direction, the spring property in the twisting direction of the suspension bush 10 can be softened.

In this way, according to the suspension bush 10, the stiff spring property in the direction perpendicular to an axis and the soft spring property in the prying direction and the twisting direction can be highly realized, respectively.

Moreover, by an experiment, it was confirmed that a ratio of the spring in the direction perpendicular to an axis with respect to the spring in the prying direction in the suspension bush 10 according to the embodiment is 20% larger than a ratio of a spring in the direction perpendicular to an axis with respect to a spring in the prying direction in a suspension bush having a conventional structure. In this way, it was also confirmed by the experiment that both the stiff spring property in the direction perpendicular to an axis and the soft spring property in the prying direction are realized in the suspension bush 10 according to the embodiment.

In addition, by an experiment, it was confirmed that a ratio of the spring in the direction perpendicular to an axis with respect to the spring in the twisting direction in the suspension bush 10 according to the embodiment is 39% larger than a ratio of the spring in the direction perpendicular to an axis with respect to a spring in the twisting direction in the suspension bush having the conventional structure. In this way, it was also confirmed by the experiment that both the stiff spring property in the direction perpendicular to an axis and the soft spring property in the twisting direction are realized in the suspension bush 10 according to the embodiment.

Although the embodiments of the disclosure have been described above in detail, the disclosure is not limited by the specific description thereof. For example, the outer peripheral surface of the inner bulging portion 18 is not limited to the arcuate vertical cross section having a constant curvature. Specifically, the central portion in the axial direction on the outer peripheral surface of the inner bulging portion 18 may have a vertical cross-sectional shape that extends linearly. In addition, it is sufficient that the outer peripheral surface of the inner bulging portion 18 has a vertical cross-sectional shape that is convex toward the outer periphery, and the inner peripheral surface of the inner bulging portion 18 may have, for example, a cross-sectional shape extending linearly in the axial direction.

The inner peripheral surface of the outer curved portion 28 may have an arcuate vertical cross section having a constant curvature. Specifically, for example, the entire inner peripheral surface of the outer curved portion 28 may be curved with a substantially constant curvature in the vertical cross section.

The inner peripheral surface 36 and the outer peripheral surface 38 of the intermediate curved portion 34 are not limited to the arcuate vertical cross section having a constant curvature. Specifically, for example, at least one of the inner peripheral surface 36 and the outer peripheral surface 38 of the intermediate curved portion 34 may have a vertical cross-sectional shape in which the central portion in the axial direction extends linearly.

In the intermediate curved portion 34, the curvature radius of the inner peripheral surface 36 may be equal to or less than the curvature radius of the outer peripheral surface 38. In this case as well, it is desirable that the intermediate curved portion 34 is gradually thick-walled toward the axial center.

According to the suspension bush having a structure according to the first aspect, because the inner bulging portion is arranged in the inner shaft member and the intermediate curved portion is arranged in the intermediate member, during prying displacement of the inner shaft member and the intermediate member, a compression component of the main body rubber elastic body between the inner shaft member and the intermediate member is reduced.

Therefore, a spring property of the suspension bush can be softened for an input in a prying direction.

In addition, the outer curved portion is arranged in the central portion in the axial direction of the outer tube member, the diameter of the outer tube member is reduced in order that the inclination angle of both axial end parts of the outer curved portion is increased, and both axial end parts of the outer curved portion are pressed against the axial end portions of the main body rubber elastic body. Thereby, the main body rubber elastic body located on the inner peripheral side of the outer curved portion is less likely to escape axially outward during an input in a direction perpendicular to an axis, and exerts a stiff spring property in the direction perpendicular to an axis due to compression.

Thus, if the suspension bush according to the aspect is applied to a suspension mechanism of a vehicle, riding comfort of the vehicle can be improved by a soft spring property in the prying direction, and travel stability of the vehicle can also be highly improved by a stiffer spring property in the direction perpendicular to an axis.

A second aspect is the suspension bush according to the first aspect, wherein a radial thickness dimension of an inner layer rubber in the main body rubber elastic body that is arranged closer to an inner peripheral side than the intermediate member is larger than a radial thickness dimension of an outer layer rubber in the main body rubber elastic body that is arranged closer to an outer peripheral side than the intermediate member at the central portion in the axial direction.

According to the suspension bush having a structure according to the aspect, by making the inner layer rubber more thick-walled than the outer layer rubber, the soft spring property caused by deformation of the inner layer rubber can be advantageously obtained for a prying input and a twisting input. In addition, by making the outer layer rubber thin-walled which has a smaller effect on the spring property for the prying input and the twisting input than the inner layer rubber, a prying spring and a twisting spring can be prevented from becoming stiff, and the stiff spring property for the input in the direction perpendicular to an axis can be realized.

A third aspect is the suspension bush according to the second aspect, wherein a radial thickness dimension of the intermediate member is larger than a part of the intermediate curved portion that is deviated outward in the axial direction.

According to the suspension bush having a structure according to the aspect, the radial thickness dimension of a central portion in the axial direction of the inner layer rubber and the radial thickness dimension of a central portion in the axial direction of the outer layer rubber can be adjusted according to the radial thickness dimension of the intermediate curved portion, and the required spring property are likely to be realized. In addition, by making both axial end parts of the intermediate member more thin-walled than the intermediate curved portion in the radial direction, a distance between facing surfaces of the intermediate member and the outer tube member in the radial direction can be secured to be large at both end portions in the axial direction. Therefore, a large change in the inclination angle of both axial end parts of the outer curved portion caused by diameter reduction of the outer tube member can be obtained, both axial end parts of the outer curved portion can be pressed more strongly against the axial end portions of the main body rubber elastic body, and the stiff spring property in the direction perpendicular to an axis can be obtained.

A fourth aspect is the suspension bush according to the second or third aspect, wherein the inner layer rubber has an inner scooped portion that is concave and opens to an axial end surface, and the outer layer rubber has an outer scooped portion that is concave and opens to the axial end surface; and by reducing the diameter of the outer tube member in order that the inclination angle of both axial end parts of the outer curved portion with respect to the axial direction is increased, a radial width dimension of an opening end of the outer scooped portion is smaller than a radial width dimension of an opening end of the inner scooped portion.

According to the suspension bush having a structure according to the aspect, because the radial width dimension of the opening end of the outer scooped portion arranged in the outer layer rubber is smaller than the radial width dimension of the opening end of the inner scooped portion arranged in the inner layer rubber by diameter reduction of the outer tube member, the rubber is suppressed from bulging and deforming axially outward in the outer layer rubber equipped with the outer scooped portion as compared with the inner layer rubber equipped with the inner scooped portion, and the stiff spring property is likely to be realized.

A fifth aspect is the suspension bush according to the fourth aspect, wherein an axial inner end of the inner scooped portion is located closer to an axial inner side than an axial inner end of the outer scooped portion.

According to the suspension bush having a structure according to the aspect, the axial width dimension of the inner layer rubber, which is a distance between the axial inner ends of the inner scooped portions arranged on both sides in the axial direction, is smaller than the axial width dimension of the outer layer rubber, which is a distance between the axial inner ends of the outer scooped portions arranged on both sides in the axial direction. Thereby, in the inner layer rubber which has a shorter circumferential length than that of the outer layer rubber and mainly deforms with respect to the prying input, a compression spring component during the prying input is reduced and a shear spring component is more dominant, and thus the soft spring property for the prying input is realized.

A sixth aspect is the suspension bush according to the fourth or fifth aspect, wherein the radial width dimension of the outer scooped portion is larger on a bottom side than at the opening end of the outer scooped portion.

According to the suspension bush having a structure according to the aspect, by arranging the inner scooped portion of the inner layer rubber and the outer scooped portion of the outer layer rubber, the soft spring property for the input in the prying direction is likely to be obtained. In addition, the radial width dimension of the outer scooped portion is larger on the bottom side than at the opening end, and the outer scooped portion does not completely collapse and disappear with respect to diameter reduction of the outer tube member and has a free surface. Therefore, the spring property of the outer layer rubber is effectively adjusted by the outer scooped portion, and stress concentration at an axial end of the outer layer rubber is relieved, thereby improving the durability of the outer layer rubber.

According to the suspension bush having a structure according to the another aspect, the radial thickness dimension of the intermediate member is larger in the intermediate curved portion arranged in the central portion in the axial direction of the intermediate member than at both axial end parts of the intermediate member. Thereby, the radial thickness dimension of the main body rubber elastic body is small in the central portion in the axial direction, and the stiff spring property for the input in the direction perpendicular to an axis is realized.

In addition, in the main body rubber elastic body, the inner layer rubber that is arranged between the inner bulging portion of the inner shaft member and the intermediate curved portion of the intermediate member in the opposite direction is made more thick-walled in the radial direction than the outer layer rubber that is arranged between the intermediate curved portion of the intermediate member and the outer curved portion of the outer tube member in the opposite direction. Therefore, in the inner layer rubber which has a shorter circumferential length than that of the outer layer rubber and deforms more positively than the outer layer rubber for the input in the prying direction and an input in a twisting direction, the soft spring property for the input in the prying direction and the input in the twisting direction can be realized. Furthermore, the outer layer rubber which has a small contribution to the spring property for the prying input and the twisting input is made more thin-walled than the inner layer rubber, and thereby the prying spring and the twisting spring can be suppressed from becoming stiff, and the stiff spring property in the direction perpendicular to an axis can be realized.

An eighth aspect is the suspension bush according to the seventh aspect, wherein the inner layer rubber has an inner scooped portion that is concave and opens to an axial end surface, and the outer layer rubber has an outer scooped portion that is concave and opens to the axial end surface; and by reducing the diameter of the outer tube member in order that the inclination angle of both axial end parts of the outer curved portion with respect to the axial direction is increased, a radial width dimension of an opening end of the outer scooped portion is smaller than a radial width dimension of an opening end of the inner scooped portion.

According to the suspension bush having a structure according to the aspect, by diameter reduction of the outer tube member, the radial width dimension of the opening end of the outer scooped portion arranged in the outer layer rubber is smaller than the radial width dimension of the opening end of the inner scooped portion arranged in the inner layer rubber. Therefore, the outer layer rubber equipped with the outer scooped portion is suppressed from bulging and deforming axially outward as compared with the inner layer rubber equipped with the inner scooped portion, and the stiff spring property by the outer layer rubber is likely to be realized.

A ninth aspect is the suspension bush according to the eighth aspect, wherein an axial inner end of the inner scooped portion is located closer to an axial inner side than an axial inner end of the outer scooped portion.

According to the suspension bush having a structure according to the aspect, the axial width dimension of the inner layer rubber, which is a distance between the axial inner ends of the inner scooped portions arranged on both sides in the axial direction, is smaller than the axial width dimension of the outer layer rubber, which is a distance between the axial inner ends of the outer scooped portions arranged on both sides in the axial direction. Thereby, in the inner layer rubber which has a shorter circumferential length than that of the outer layer rubber and mainly deforms with respect to the prying input, a compression spring component during the prying input is reduced and a shear spring component is more dominant, and thus the soft spring property for the prying input is realized.

A tenth aspect is the suspension bush according to any one of the first to ninth aspects, wherein a curvature of an inner peripheral surface of the intermediate curved portion is smaller than a curvature of an outer peripheral surface of this intermediate curved portion.

According to the suspension bush having a structure according to the aspect, due to a difference between the curvature of the inner peripheral surface of the intermediate curved portion and the curvature of the outer peripheral surface of the intermediate curved portion, the intermediate curved portion can be made thick-walled with a smooth surface shape.

According to the disclosure, the spring property required for the suspension bush can be realized more highly.

What is claimed is:

1. A suspension bush, comprising:
an inner shaft member;
an outer tube member, connected with the inner shaft member in a radial direction by a main body rubber elastic body; and
an intermediate member, arranged between the inner shaft member and the outer tube member in the radial direction and fixed to the main body rubber elastic body,
wherein the inner shaft member comprises an inner bulging portion located at a central portion in an axial direction and having an outer surface shape that is convex toward an outer periphery of the inner shaft member, the outer tube member comprises an outer curved portion located at the central portion in the axial direction and having a curved cross-sectional shape that is concave toward an inner periphery of the outer tube member, and the intermediate member comprises an intermediate curved portion located at the central portion in the axial direction and having a curved cross-sectional shape that is concave toward an inner periphery of the intermediate member;
the main body rubber elastic body is pre-compressed by diameter reduction of the outer tube member, an inclination angle of both axial end parts of the outer curved portion with respect to the axial direction is increased by diameter reduction of the outer tube member, and both axial end parts of the outer curved portion are pressed against axial end portions of the main body rubber elastic body, and
a radial thickness dimension of an inner layer rubber in the main body rubber elastic body that is arranged closer to an inner peripheral side than the intermediate member is larger than a radial thickness dimension of an outer layer rubber in the main body rubber elastic body that is arranged closer to an outer peripheral side than the intermediate member at the central portion in the axial direction.

2. The suspension bush according to claim 1, wherein a radial thickness dimension of the intermediate member is larger than a part of the intermediate curved portion that is deviated outward in the axial direction.

3. The suspension bush according to claim 2, wherein the inner layer rubber has an inner scooped portion that is concave and opens to an axial end surface, and the outer layer rubber has an outer scooped portion that is concave and opens to the axial end surface; and
by reducing the diameter of the outer tube member in order that the inclination angle of both axial end parts of the outer curved portion with respect to the axial direction is increased, a radial width dimension of an opening end of the outer scooped portion is smaller than a radial width dimension of an opening end of the inner scooped portion.

4. The suspension bush according to claim 1, wherein the inner layer rubber has an inner scooped portion that is concave and opens to an axial end surface, and the outer layer rubber has an outer scooped portion that is concave and opens to the axial end surface; and
by reducing the diameter of the outer tube member in order that the inclination angle of both axial end parts of the outer curved portion with respect to the axial direction is increased, a radial width dimension of an opening end of the outer scooped portion is smaller than a radial width dimension of an opening end of the inner scooped portion.

5. The suspension bush according to claim 4, wherein an axial inner end of the inner scooped portion is located closer to an axial inner side than an axial inner end of the outer scooped portion.

6. The suspension bush according to claim 5, wherein the radial width dimension of the outer scooped portion is larger on a bottom side than at the opening end of the outer scooped portion.

7. The suspension bush according to claim 4, wherein the radial width dimension of the outer scooped portion is larger on a bottom side than at the opening end of the outer scooped portion.

8. The suspension bush according to claim 1, wherein a curvature of an inner peripheral surface of the intermediate curved portion is smaller than a curvature of an outer peripheral surface of this intermediate curved portion.

9. A suspension bush, comprising:
an inner shaft member;
an outer tube member, connected with the inner shaft member in a radial direction by a main body rubber elastic body; and
an intermediate member, arranged between the inner shaft member and the outer tube member in the radial direction and fixed to the main body rubber elastic body,
wherein the inner shaft member comprises an inner bulging portion located at a central portion in an axial direction and having an outer surface shape that is convex toward an outer periphery of the inner shaft member, the outer tube member comprises an outer curved portion located at the central portion in the axial direction and having an inner surface shape that is concave toward an inner periphery of the outer tube member, and the intermediate member comprises an intermediate curved portion located at the central portion in the axial direction and having a curved cross-sectional shape that is concave toward an inner periphery of the intermediate member; and
a radial thickness dimension of the intermediate member is larger than a part of the intermediate curved portion that is deviated outward in the axial direction, and a radial thickness dimension of an inner layer rubber in the main body rubber elastic body that is arranged closer to an inner peripheral side than the intermediate member is larger than a radial thickness dimension of an outer layer rubber in the main body rubber elastic body that is arranged closer to an outer peripheral side than the intermediate member at the central portion in the axial direction.

10. The suspension bush according to claim 9, wherein the inner layer rubber has an inner scooped portion that is concave and opens to an axial end surface, and the outer layer rubber has an outer scooped portion that is concave and opens to the axial end surface; and
by reducing the diameter of the outer tube member in order that the inclination angle of both axial end parts of the outer curved portion with respect to the axial direction is increased, a radial width dimension of an opening end of the outer scooped portion is smaller than a radial width dimension of an opening end of the inner scooped portion.

11. The suspension bush according to claim 10, wherein an axial inner end of the inner scooped portion is located closer to an axial inner side than an axial inner end of the outer scooped portion.

12. The suspension bush according to claim 9, wherein a curvature of an inner peripheral surface of the intermediate curved portion is smaller than a curvature of an outer peripheral surface of this intermediate curved portion.

* * * * *